United States Patent
Busuioc et al.

(10) Patent No.: US 11,254,037 B2
(45) Date of Patent: Feb. 22, 2022

(54) WATER-ASSISTED INJECTION MOLDED CROSS-CAR BEAM

(71) Applicant: Ford Global Technologies, LLC, Dearborn, MI (US)

(72) Inventors: Dan Busuioc, Dearborn, MI (US); Bernard Gerard Marchetti, Rochester Hills, MI (US); Gary D. Mullen, Plymouth, MI (US); Nicholas Andrew Mazzocchi, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 16/928,239

(22) Filed: Jul. 14, 2020

(65) Prior Publication Data

US 2020/0338797 A1 Oct. 29, 2020

Related U.S. Application Data

(62) Division of application No. 15/911,982, filed on Mar. 5, 2018, now Pat. No. 10,759,099.

(51) Int. Cl.
| | | |
|---|---|---|
| *B29C 45/17* | (2006.01) | |
| *B62D 25/14* | (2006.01) | |
| *B62D 29/04* | (2006.01) | |
| *B29L 31/30* | (2006.01) | |

(52) U.S. Cl.
CPC ...... *B29C 45/1706* (2013.01); *B29C 45/1711* (2013.01); *B62D 25/145* (2013.01); *B62D 29/043* (2013.01); *B29C 2045/172* (2013.01); *B29C 2045/1707* (2013.01); *B29C 2045/1723* (2013.01); *B29C 2045/1726* (2013.01); *B29L 2031/3055* (2013.01)

(58) Field of Classification Search
None
See application file for complete search history.

(56) References Cited

U.S. PATENT DOCUMENTS

| | | | |
|---|---|---|---|
| 5,225,141 | A | 7/1993 | Hendry |
| 6,644,722 | B2 | 11/2003 | Cooper |
| 7,125,466 | B2 | 10/2006 | Cooper et al. |
| 9,446,540 | B2 | 9/2016 | Marchetti et al. |
| 2005/0264040 | A1 | 12/2005 | Bailey et al. |
| 2015/0321704 | A1* | 11/2015 | Marchetti ............ B62D 27/026 296/70 |
| 2019/0270230 | A1 | 9/2019 | Busuioc et al. |

FOREIGN PATENT DOCUMENTS

WO 2004060738 A1 7/2004

* cited by examiner

*Primary Examiner* — Monica A Huson
(74) *Attorney, Agent, or Firm* — David Coppiellie; Price Heneveld LLP (57) ABSTRACT

A method of forming a cross-car beam is provided. A composite is melted to form a viscous polymer. The polymer is injected into a mold. Pressurized fluid is injected into the mold to evacuate a portion of the viscous polymer from the mold and to form a channel therethrough. The remaining viscous polymer is cooled within the mold to form a cross-car beam.

19 Claims, 6 Drawing Sheets

WATER-ASSISTED INJECTION MOLDED CROSS-CAR BEAM

CROSS-REFERENCE TO RELATED APPLICATION

This application is a divisional of U.S. patent application Ser. No. 15/911,982, now U.S. Pat. No. 10,759,099, filed on Mar. 5, 2018, and entitled "WATER-ASSISTED INJECTION MOLDED CROSS-CAR BEAM," which is incorporated herein by reference in its entirety.

FIELD OF THE INVENTION

The present invention generally relates to a cross-car beam for a vehicle, and more particularly, a carbon fiber cross-car beam with gas or water-assisted channels.

BACKGROUND OF THE INVENTION

In an effort to decrease the weight of internal vehicle components, it is becoming common for vehicles to utilize lightweight materials in order to increase vehicle performance and fuel economy. Weight savings can be realized by substituting traditional structural materials with lightweight materials. However, lightweight materials are often costly and reductions in mass may be offset by increases in cost. Additionally, reductions in mass may reduce the structural integrity of the components. As such, there is a need to tailor the mechanical properties of a cross-car beam structure in order to realize the advantages of lightweight materials while minimizing the costs associated with production and design. The present disclosure is intended to satisfy this need.

SUMMARY OF THE INVENTION

According to a first aspect of the present invention, a method of forming a cross-car beam is provided. A composite material is melted to form a viscous polymer. The viscous polymer is injected into a mold. A pressurized fluid is injected into the mold to evacuate a portion of the viscous polymer from the mold and to form a channel therethrough. The remaining viscous polymer is cooled within the mold to form a cross-car beam.

Embodiments of the first aspect of the invention can include any one or a combination of the following features:
- cooling the viscous polymer such that a solid layer of composite material is formed around the viscous polymer within the mold concurrently with the step of injecting pressurized fluid into the mold;
- cooling the viscous polymer such that a solid layer of composite material is formed prior to the step of injecting pressurized fluid into the mold;
- a layer of the viscous polymer within the mold is at least 210° C. at the time the pressurized fluid is injected into the mold;
- injecting pressurized fluid into the mold via at least one injection line coupled to the mold at at least one connection port to form one or more channels through the mold;
- cooling the evacuated viscous polymer to reform the composite material for use in subsequent injection molding applications; and
- the composite material includes at least one of a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole.

According to a second aspect of the present invention, a method of forming a cross-car beam is provided. A composite material is melted to form a viscous polymer. The viscous polymer is injected into a mold, the mold including a cavity that remains unfilled with viscous polymer. A pressurized fluid is inserted into the mold in order to force a portion of the viscous polymer into the cavity to form a channel enclosed by solid composite material. The viscous polymer is cooled within the mold to form a cross-car beam.

Embodiments of the second aspect of the invention can include any one or a combination of the following features:
- cooling the viscous polymer such that a solid layer of composite material is formed around the viscous polymer within the mold at least concurrently with the step of injecting pressurized fluid into the mold;
- cooling the viscous polymer such that a solid layer of composite material is formed prior to the step of injecting pressurized fluid into the mold;
- a volume of the channel is proportionate to a volume of the cavity;
- injecting pressurized fluid into the mold via at least one injection line coupled to the mold at at least one connection port to force a portion of viscous polymer into a cavity to form one or more channels through the mold;
- injecting pressurized fluid into the mold is carried out while the solid layer of composite material has formed around the layer of the viscous polymer; and
- the viscous polymer is at least 210° C. during the step of inserting pressurized fluid into the mold.

According to a third aspect of the present invention, a cross-car beam assembly is provided. A composite beam structure includes carbon fibers within a nylon resin. A channel disposed within the composite beam structure is formed by injecting a viscous polymer into a cross-car beam mold, injecting a pressurized fluid into the mold as the viscous polymer begins to cool such that a portion of the viscous polymer is displaced from the mold, and cooling the viscous polymer to form a cross-car beam.

Embodiments of the third aspect of the invention can include any one or a combination of the following features:
- the channel extends from a steering column support section to a center-stack portion of the composite beam structure;
- the viscous polymer includes a recycled composite material;
- the composite material includes a nylon resin with a weight fraction of about 15% to 40% glass or carbon fibers;
- the composite material includes a combination of at least one of chopped glass and carbon fibers; and
- the composite material includes at least one of a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
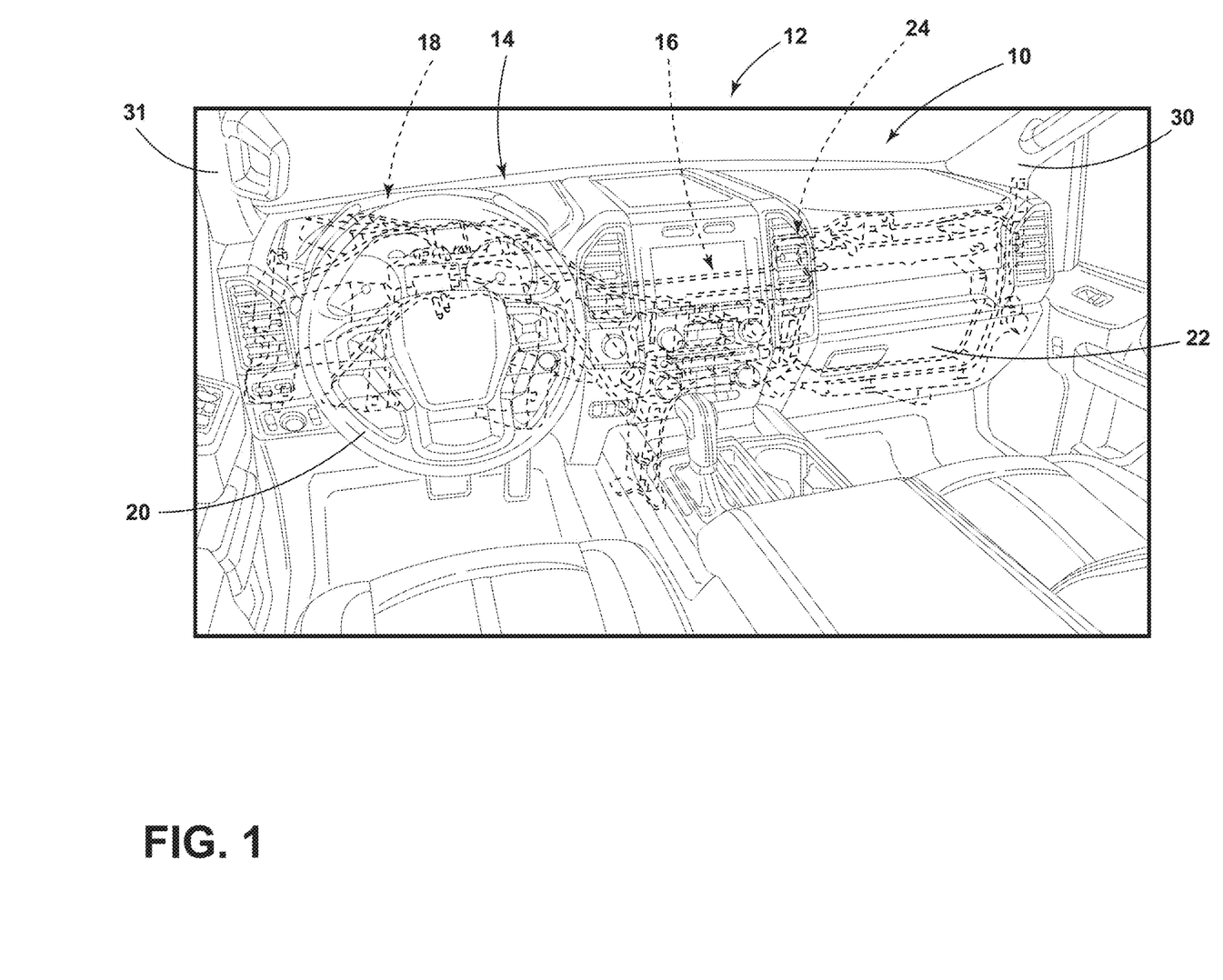
FIG. 1 illustrates a front passenger cabin of a vehicle, wherein a number of loads are at least partially supported by a cross-car beam assembly.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a method of assembling a cross-car beam for a vehicle using a water-assisted injection molding system. The cross-car beam assembly is adapted to utilize the lightweight aspects of vehicular components formed of composite materials, while also reducing the amount of mass and costs associated with such composite materials. The method involves melting a composite material to form a viscous polymer. The viscous polymer is then injected into a mold. A pressurized fluid is then injected into the mold to evacuate a portion of viscous polymer from the mold and to form a channel therethrough. The remaining viscous polymer within the mold is then cooled to form a composite cross-car beam including a channel therethrough.

Referring to FIG. 1, a front passenger cabin 10 of a vehicle 12 is shown. The front passenger cabin 10 includes an instrument panel 14 at least partially supported by a cross-car beam assembly 16 generally shown in phantom lining. For exemplary purposes, the cross-car beam assembly 16 may also at least partially support a heating, ventilation, and air conditioning (HVAC) unit (not shown), one or more passenger airbags (not shown), a steering column 18 and a steering wheel 20, and a glove compartment 22. However, it will be understood that the cross-car beam assembly 16 may additionally or alternatively support other loads if desired. In addition to providing support for a variety of vehicle components, the cross-car beam assembly 16 also functions to provide stability to the vehicle 12 and resists compressive forces caused by vehicle impact.

With continued reference to FIG. 1, the cross-car beam assembly 16 is generally positioned vehicle-forward of the instrument panel 14 and includes a composite beam structure 24. In the depicted embodiment, the composite beam structure 24 extends transversely across the vehicle 12. The composite beam structure 24 may directly or indirectly support the instrument panel 14 and/or other loads and may be engaged to a vehicle frame, side pillars 30 and 31, and/or other suitable structures of the vehicle 12.

Figure 2:
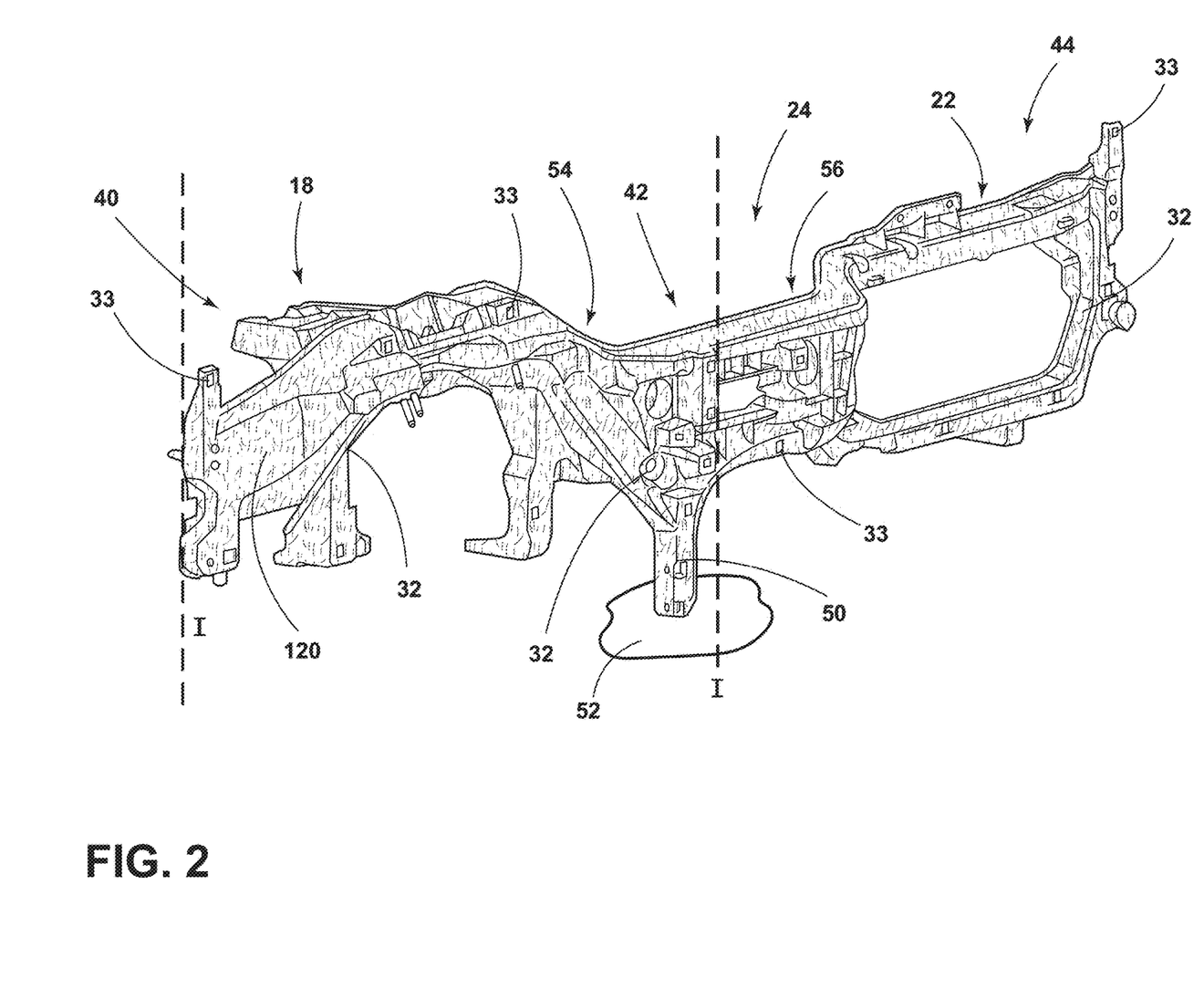
FIG. 2 illustrates a composite beam structure of the cross-car beam assembly.

Referring to FIG. 2, the composite beam structure 24 exemplarily includes various frame areas 32 along the composite beam structure 24 for accommodating different loads as well as attachment points 33 for allowing different loads to be secured to the composite beam structure 24 using mechanical fasteners, adhesives, and the like. The attachment points 33 may also serve to secure the composite beam structure 24 to the vehicle 12. The composite beam structure 24 includes a driver-side portion 40 proximate the steering column 18, a passenger-side portion 44 proximate the glove compartment 22, and a center-stack portion 42 disposed between driver-side and passenger-side portions 40, 44. The composite beam structure 24 additionally includes a vertical support 50 extending downwardly from the center-stack portion 42 of the composite beam structure 24 and coupled to a vehicle floor structure 52. A first support arm 54 extends from the vertical support 50 to the steering column 18 and is inclined from the center-stack portion 42 of the composite beam structure 24 towards the driver-side portion 40. A second support arm 56 extends from the vertical support 50 towards the passenger side portion 44. Each of the first and second support arms 54, 56 may be a continuous structure including multiple areas 32 along the composite beam structure 24.

Still referring to FIG. 2, the composite beam structure 24 may be formed from a composite material 120. In one exemplary embodiment, the composite beam structure 24 is formed from a nylon resin having chopped carbon and/or glass fibers disposed within the resin. In general, regions of the composite beam structure with higher percentages of chopped fibers can have enhanced mechanical properties (e.g., toughness, tensile strength, fatigue resistance). The carbon or glass fiber weight fraction in the composite cross-car beam assembly 16 may be between about 1% and about 60%, preferably between about 15% and about 40%, and more preferably between about 30% to about 40%. In some embodiments, the fiber weight fraction in the driver-side portion 40 may be different from the fiber weight fraction in the passenger-side portion 44 of the composite beam structure 24. In additional embodiments, areas 32 of the composite beam structure 24 that are anticipated to encounter high stresses are configured to incorporate higher fiber weight fractions of chopped carbon fibers. For example, the driver-side portion 40 supporting the steering column 18 may incorporate a higher weight fraction than the rest of the composite beam structure 24. In other embodiments, the composite beam structure 24 may incorporate more than two composite materials 120.

In some embodiments, the fibers employed in the composite beam structure 24 can be composed of materials including, but not limited to, carbons, aramids, aluminum metals, aluminum oxides, steels, borons, silicas, silicon carbides, silicon nitrides, ultra-high-molecular-weight polyethylenes, A-glasses, E-glasses, E-CR-glasses, C-glasses, D-glasses, R-glasses, and S-glasses. In some embodiments, the length of the chopped fibers can be between about 3 mm and about 11 mm, and more preferably between about 5 mm and about 7 mm. Typically, the fibers are randomly oriented in the resins within the composite beam structure 24. However, they may also be directionally aligned in areas of the composite beam structure 24 subject to high directional stresses. The segregation of the fibers, e.g., chopped carbon and glass fibers, in the composite beam structure 24 allows the higher strength fiber, e.g., carbon fiber, to be selectively used where there are particular high strength needs for the composite beam structure 24, such as to support the steering column 18. The selective use of high percentages of carbon fibers based on driver/passenger orientation relative to the vehicle 12 allows a cost savings by efficiently and selectively using the more expensive carbon fibers as needed. With respect to the embodiments herein, the resins employed in the composite beam structure 24 can include a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole, or combinations thereof.

Figure 3:
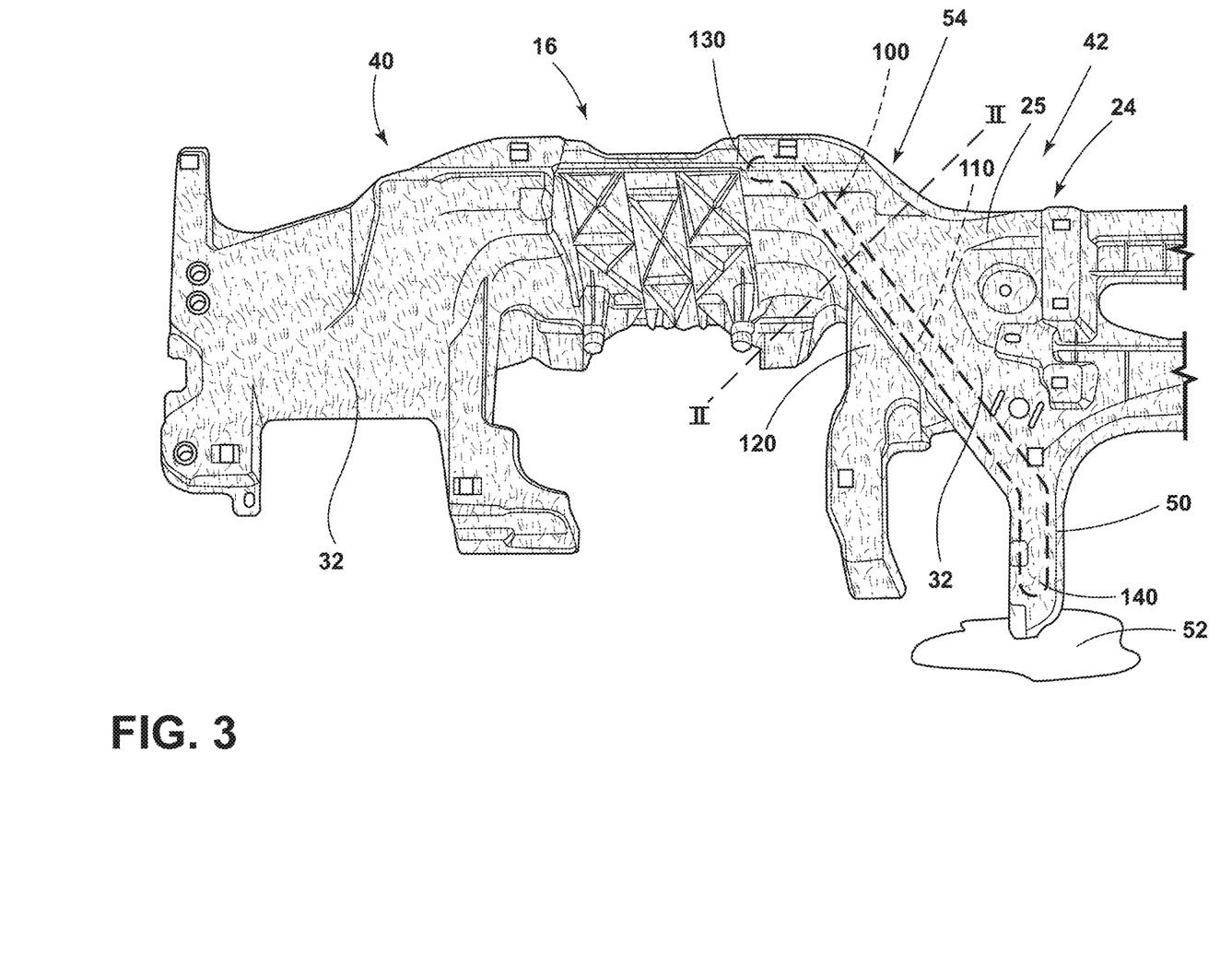
FIG. 3 illustrates a portion of the cross-car beam assembly taken from lines I-I of FIG. 2.

Referring to FIG. 3, a portion of the composite beam structure 24 is shown including the driver-side portion 40 to the center-stack portion 42. A channel 100 is disposed within the composite beam structure 24. The channel 100 extends through the first support arm 54 to form a hollow chamber 110 within the composite beam structure 24 enclosed by solid composite material 120. The channel 100 has a first end 130 proximate to the top of the steering column 18, and a second end 140 disposed within the vertical support 50. The channel 100 is configured to retain the geometric stiffness of the composite beam structure 24 while reducing the mass of the composite material 120. One of ordinary skill in the art will understand that the channel 100 may extend across different areas 32 of the composite beam structure 24 depending on the mechanical properties and varying loads of the vehicle 12. For instance, a channel 100 may be formed more or less proximate to the center-stack portion 42 of the composite beam structure 24. In yet another embodiment, the channel 100 may extend through the second support arm 56 and any areas 32 associated therewith.

Figure 4:
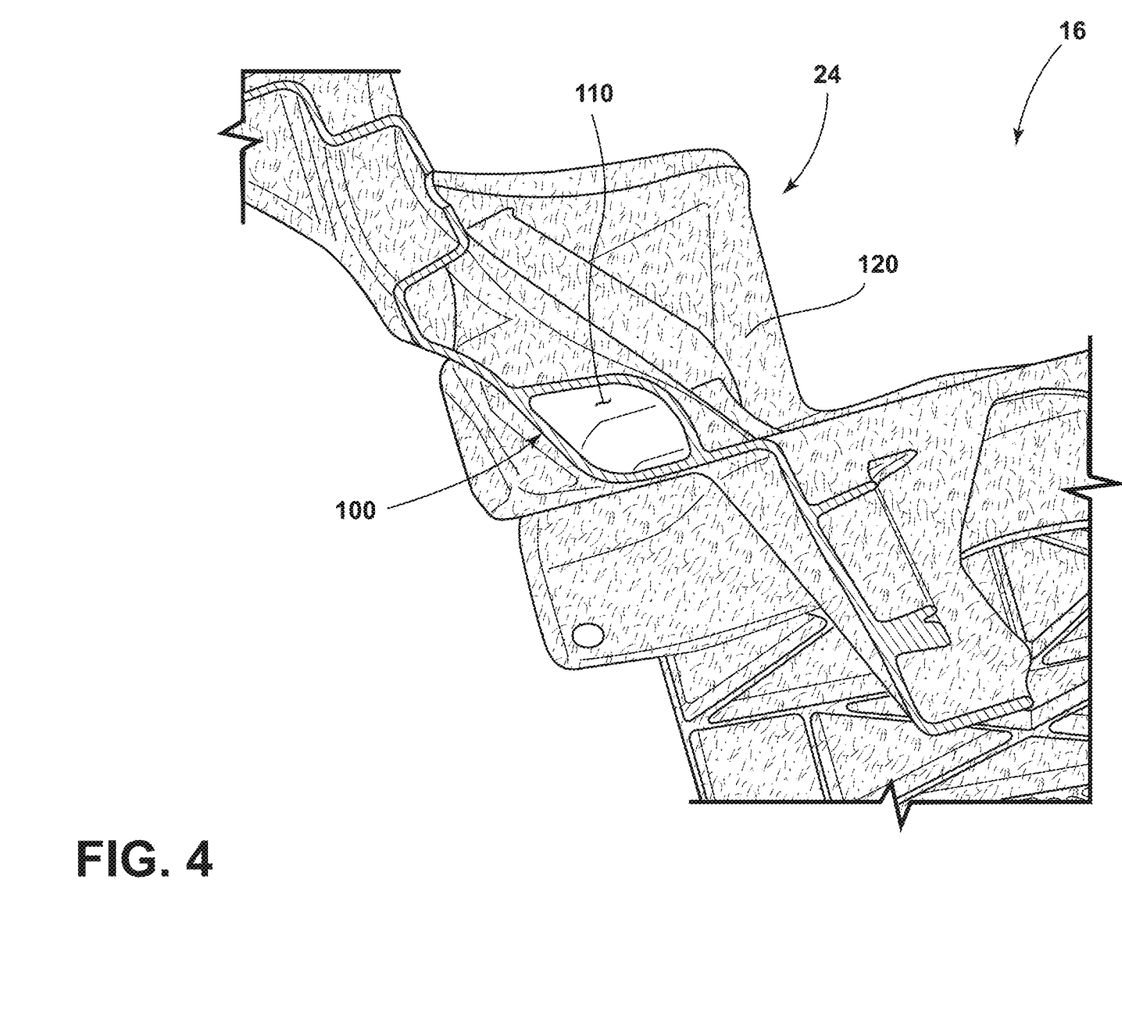
FIG. 4 is a cross sectional view of the cross-car beam assembly taken from lines II-II of FIG. 3.

Referring to FIGS. 3-4, the size, shape and dimension of the channel 100 may vary in order to compensate for the structural requirements of the cross-car beam assembly 16. In some embodiments a narrow channel may be formed where the cross-car beam assembly 16 is configured to encounter greater load stresses. In other embodiments, a wider channel may be formed where the cross-car beam assembly 16 is configured to encounter less load stress, resulting in a reduction in costs in the form of composite material 120 mass savings. As shown in FIG. 4, the channel 100 retains the geometry of the composite beam structure 24. However, the mass of the composite beam structure 24 decreases in proportion to the volume of the chamber 110 formed in assembly.

Figure 5:
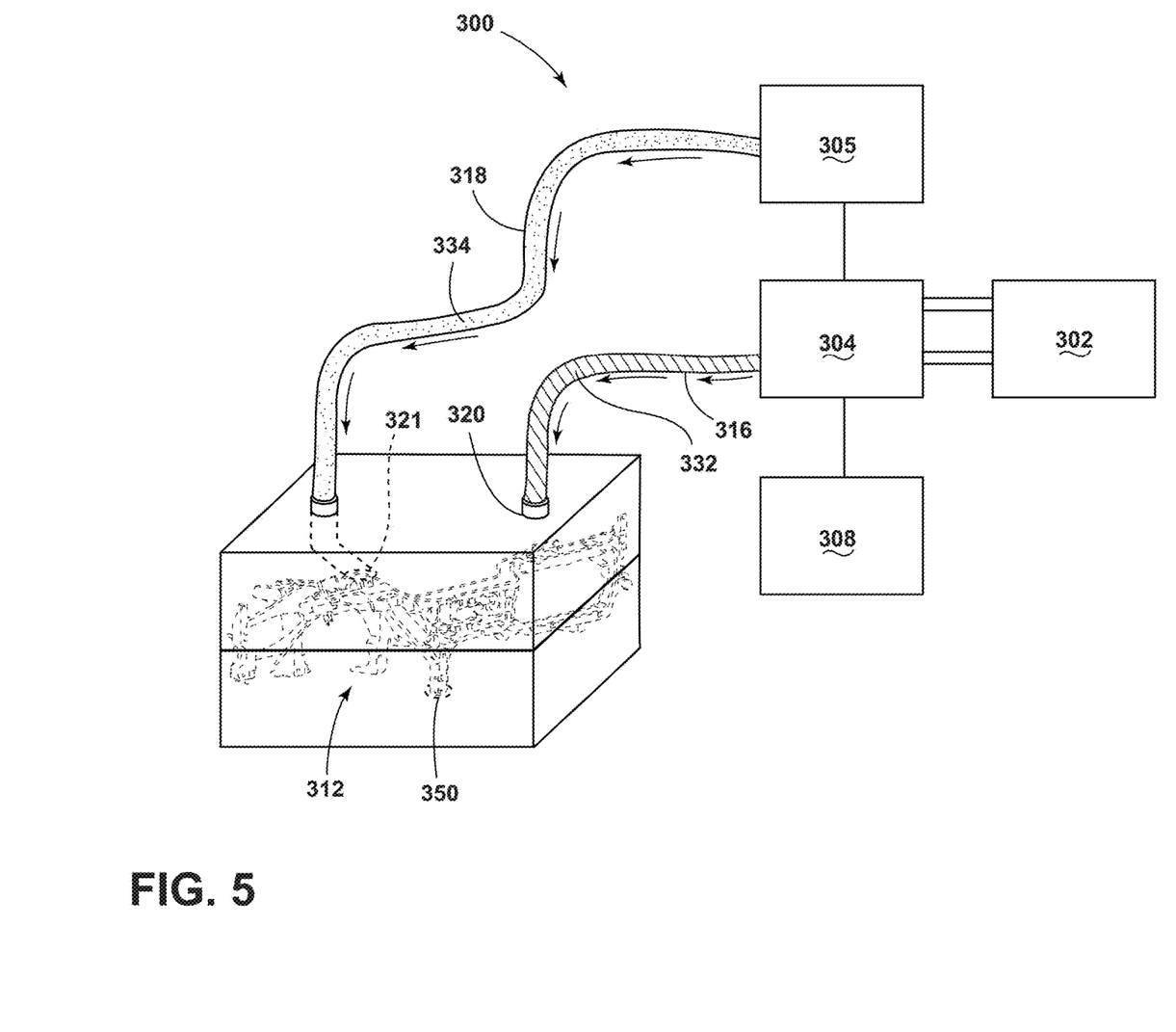
FIG. 5 illustrates an injection molding system including a fluid injection line.

Referring to FIG. 5, a water-assisted injection molding system 300 is depicted that includes a heater 302, a first pump 304, a second pump 305, a controller 308, a cross-car beam mold 312, and a first and a second injection line 316, 318. The injection molding system 300 provided herein is configured for formation of the cross-car beam assembly 16 provided in FIGS. 1-4. The heater 302 melts the composite material 120 into a viscous polymer 332 and the first pump 304 pressurizes and forces the viscous polymer 332 through the first injection line 316 and into the cross-car beam mold 312. The first pump 304 is capable of producing high fluid pressures, which permit the viscous polymer 332 to be injected into the cross-car beam mold 312 at high pressures and speeds. The first pump 304 may include a screw and barrel assembly of the injection molding system 300. The first injection line 316 engages a first connection port 320 of the cross-car beam mold 312 such that the viscous polymer 332 can enter the cross-car beam mold 312. In some embodiments of the system 300, multiple injection lines may connect to multiple connection ports of the cross-car beam mold 312 such that the viscous polymer 332 can enter the cross-car beam mold 312 at different locations. The second pump 305 pressurizes and forces fluid 334 (e.g., water) through the second injection line 318 and into the cross-car beam mold 312 at a second connection port 321. The second pump 305 is capable of producing high fluid pressures which permit the fluid 334 to be injected into the cross-car beam mold 312 such that the viscous polymer 332 is displaced within the cross-car beam mold 312 to form a channel (e.g., channel 100) therethrough. When the fluid 334 is injected into the cross-car beam mold 312, a gate valve 350 is opened and the displaced viscous polymer 332, as well as the fluid 334, is evacuated from the cross-car beam mold 312. The gate valve 350 is closed and the viscous polymer 332 inside the cross-car beam mold 312 is then cooled to form the composite beam structure 24 with a hollow chamber (e.g., hollow chamber 110) enclosed by hardened composite material 120 (FIGS. 3 and 4). In some embodiments of the system 300, multiple injection lines may connect to multiple connection ports of the cross-car beam mold 312 such that fluid can enter the cross-car beam mold 312 at different locations. The evacuated viscous polymer 332 may be cooled into the composite material 120 and it may then be recycled and used in further injection molding applications.

In another embodiment, the cross-car beam mold 312 may include a cavity (not shown) that remains vacant after the viscous polymer 332 is injected into the cross-car beam mold 312. The second pump 305 may then inject the fluid 334 into the cross-car beam mold 312 to force the viscous polymer 332 into the cavity, thereby forming the channel 100 proximate the filled cavity. The viscous polymer 332 inside the cross-car beam mold 312 is then cooled to form the composite beam structure 24. In this embodiment, there is no unused viscous polymer 332 and no need to recycle the evacuated viscous polymer 332 for further use. Furthermore, the volume of the channel 100 is proportionate to the volume of the cavity.

Figure 6:
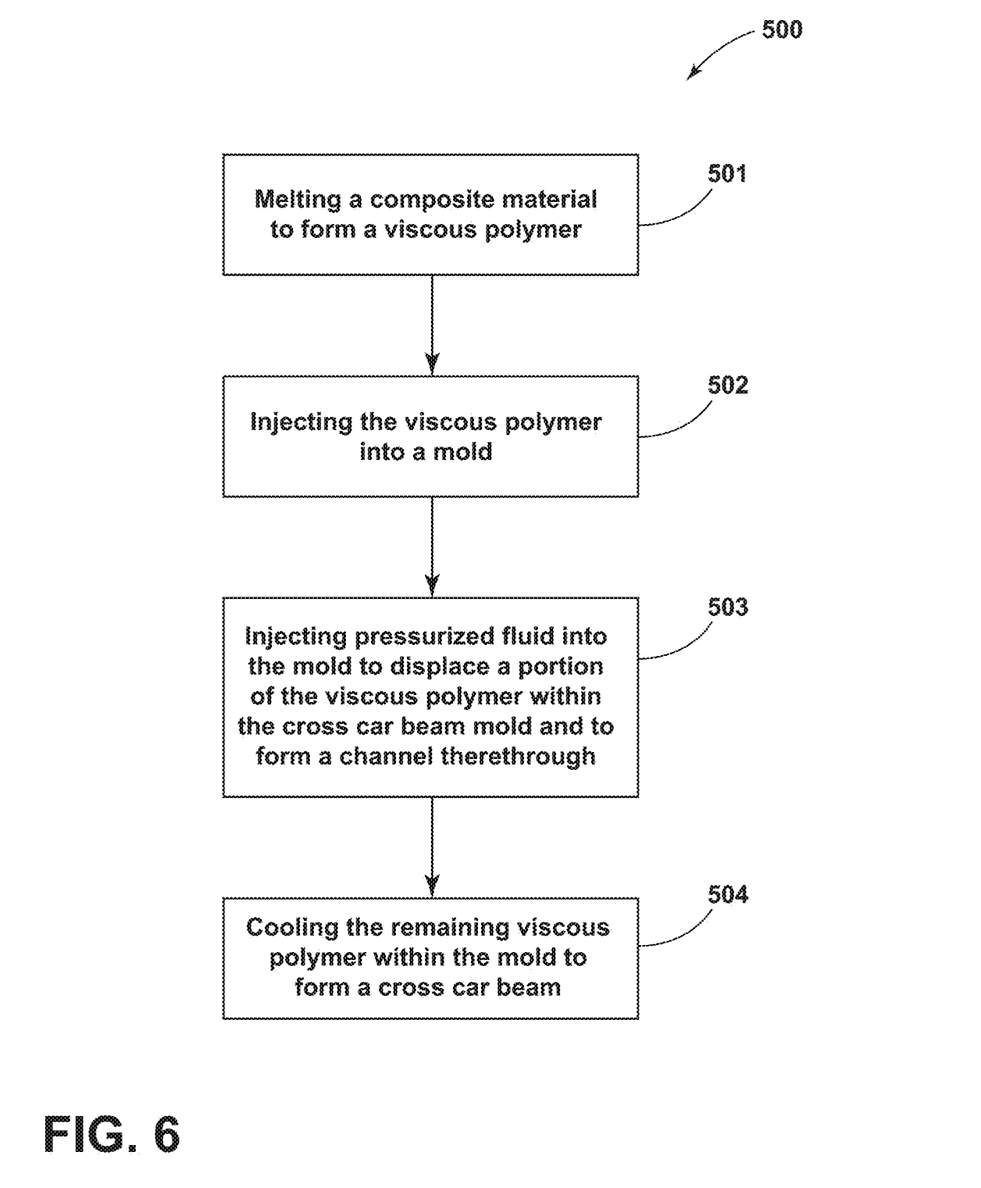
FIG. 6 is a flow diagram of a method for forming a cross-car beam including a hollow enclosed channel using the water-assisted injection molding system of FIG. 5.

Referring to FIG. 6, a method 500 is shown for the formation of the cross-car beam assembly 16, and includes steps 501, 502, 503, 504. The method 500 utilizes the injection molding system 300 described in FIG. 5 in forming the cross-car beam assembly 16 depicted in FIGS. 1-4. The method includes melting the composite material 120 into a viscous polymer 332 at step 501, followed by injecting the viscous polymer 332 into the cross-car beam mold 312 at step 502. Next, at 503, pressurized fluid 334 is injected into the cross-car beam mold 312 to displace a portion of the viscous polymer 332 within the cross-car beam mold 312 to form the channel 100 therethrough. Finally at 504, the remaining viscous polymer 332 is cooled within the cross-car beam mold 312 to form the cross-car beam assembly 16.

More specifically, and with reference to FIGS. 5 and 6, step 501 involves heating the composite material 120 in the heater 302 to a temperature sufficient to melt the resin constituents into the viscous polymer 332. Having melted the resins, the first pump 304 moves the viscous polymer 332 through the first injection line 316 and into the cross-car beam mold 312 via the first connection port 320. The viscous polymer 332 can be injected at a temperature between 100° C. and 400° C., and more preferably between 210° C. and 300° C. The viscous polymer 332 is superheated to a sufficiently high temperature to prevent premature solidification in the first injection line 316 prior to steps 502 and 503. As used herein, the term "superheat" refers to the temperature difference between the melting temperature of the composite material 120 and the injection temperature of the viscous polymer 332. The superheat may be between 10° C. and 50° C. for the composite material 120 and viscous polymer 332. Other injection temperatures and superheat conditions may be appropriate depending on the compositions selected for the composite materials, geometry of the cross-car beam mold 312, dimensions of the channel 100, and other conditions.

The step 502 of injecting the viscous polymer 332 into the cross-car beam mold 312 may have a duration between 1 and 30 seconds, and more preferably between 10 and 20 seconds. Other durations may be appropriate for more complex cross-car beam mold cavity geometries and/or lower melt viscosity compositions for the viscous polymer 332. The step 503 of injecting the pressurized fluid 334 into the cross-car beam mold 312 may occur concurrently with step 502 or may occur shortly thereafter. Preferably, the step 503 of injecting the pressurized fluid into the cross-car beam mold 312 will occur immediately after step 502 (i.e., within milliseconds) and prior to the step 504 of cooling the remaining viscous polymer within the cross-car beam mold 312 to form the cross-car beam assembly 16. As described herein, at least one injection line (e.g., second injection line 318) may be coupled to at least one connection port (e.g., second connection port 321) across the cross-car beam mold 312. Each injection line may be configured to inject high pressure fluid 334 into the cross-car beam mold 312 to evacuate a portion of viscous polymer 332 from the cross-car beam mold 312 to form one or more channels at various locations within the cross-car beam mold 312. Between steps 502 and 503, a cooling phase may occur where the outer layer of viscous polymer 332 cools within the cross-car beam mold 312 to form hardened composite material 120. During this phase, an inner layer of viscous polymer 332 remains beneath the hardened composite material 120. This phase may generally occur within milliseconds of steps 502 and 503, but may occur at a different time interval depending on the composition of the composite material 120, geometry of the cross-car beam mold 312, dimensions of the channel 100, and other conditions. As the pressurized fluid 334 is injected into the cross-car beam mold 312 at step 503, a portion of the viscous polymer 332 is forced towards the gate valve 350. The gate valve 350 is opened and the portion of the viscous polymer 332 is evacuated from the cross-car beam mold 312. The evacuated viscous polymer 332 may then be cooled outside of the cross-car beam mold 312 to reform the composite material 120. The composite material 120 may be ground and reused in subsequent injection molding applications.

In another embodiment of step 503, the cross-car beam mold 312 includes a cavity (not shown) that remains without viscous polymer 332 following step 502. During step 503, the fluid 334 is injected into the cross-car beam mold 312 at the second connection port 321 and the portion of viscous polymer 332 is forced into the cavity disposed within the cross-car beam mold 312, and a channel 100 is formed proximate the location of the cavity. In this embodiment, no viscous polymer 332 is evacuated from the cross-car beam mold 312 and no composite material 120 is recycled.

During Step 504, the viscous polymer 332 is cooled inside of the cross-car beam mold 312 to form a cross-car beam assembly 16 from the hardened composite material 120. After step 504, the cross-car beam assembly 16 is prepared for installation in the vehicle 12.

Accordingly, a method of forming a cross-car beam assembly has been advantageously provided herein. A composite material is melted to form a viscous polymer. The viscous polymer is injected into a cross-car beam mold. The viscous polymer may be cooled such that a solid layer of composite material is formed around the viscous polymer within the mold. Pressurized fluid is injected into the mold to evacuate a portion of the viscous polymer from the mold and to form a channel therethrough. In yet another embodiment, a plurality of fluid injection lines may be engaged to the mold at various connection ports on the mold. Each of the plurality of fluid injection lines may inject pressurized fluid into the cross-car beam mold at various connection ports to form a plurality of channels within the mold. The viscous polymer may be cooled to form a solid layer of composite material prior to or at least at the same time as pressurized fluid is injected into the mold. The layer of the viscous polymer within the mold may be at least 210° C. at the time the pressurized fluid is injected into the mold. The remaining viscous polymer is then cooled to form the cross-car beam assembly. The evacuated viscous polymer may be cooled to reform the composite material for use in a subsequent injection application.

In yet another embodiment, the mold may include a cavity that remains unfilled with viscous polymer after the viscous polymer is injected into the mold. The pressurized fluid may be injected into the mold in order to force a portion of viscous polymer into the cavity to form a channel enclosed by a layer of solid composite material. In this embodiment, the volume of the channel is proportionate to the volume of the cavity.

The cross-car beam assembly may be formed of a recycled composite material. The composite material may be formed of a nylon resin with a weight fraction of about 15% to 40% of glass and/or carbon fibers. The composite material may include chopped glass or carbon fibers or a hybrid combination of glass and carbon fibers. Additionally, the composite material includes at least one of a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

It is also important to note that the construction and arrangement of the components of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, components shown as integrally formed may be constructed of multiple parts, or elements shown as multiple parts may be integrally formed, the length or width of the structures may be varied, and the nature or numeral of adjustment positions provided between the components may be varied. It should be noted that the components may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A cross-car beam assembly, comprising;
   a composite beam structure comprised of carbon fibers within a nylon resin;
   a channel disposed within the composite beam structure formed by:
      injecting a viscous polymer into a cross-car beam mold, wherein the viscous polymer is comprised of a recycled composite material;
      inserting a pressurized fluid into the mold as the viscous polymer begins to cool such that a portion of the viscous polymer is displaced from the mold;
      cooling the remaining viscous polymer within the mold to form a cross-car beam.

2. The cross-car beam assembly of claim 1, wherein the channel extends from a steering column support section to a center-stack portion of the composite beam structure.

3. The cross-car beam assembly of claim 1, wherein the composite material is comprised of the nylon resin with a weight fraction of about 15% to 40% glass or carbon fibers.

4. The cross-car beam assembly of claim 1, wherein the composite material is comprised of a combination of at least one of chopped glass and carbon fibers.

5. The cross-car beam assembly of claim 1, wherein the composite material comprises at least one of a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole.

6. A cross-car beam assembly, comprising:
   a composite beam structure comprised of carbon fibers within a nylon resin, the composite beam structure including a vertical support;
   a first support arm extending from the vertical support;
   a second support arm extending from the vertical support; and
   a channel extending through the first support arm and defining a narrow channel therethrough to accommodate a greater load stress.

7. The cross-car beam assembly of claim 6, wherein the channel includes a first end and a second end disposed within the vertical support.

8. The cross-car beam assembly of claim 6, wherein the channel extends through the second support arm.

9. The cross-car beam assembly of claim 6, wherein the channel extends from a steering column support section to a center-stack portion of the composite beam structure.

10. The cross-car beam assembly of claim 6, wherein the composite material of the composite beam structure is comprised of the nylon resin with a weight fraction of about 15% to 40% glass or carbon fibers.

11. The cross-car beam assembly of claim 6, wherein the first arm extends toward a driver-side portion of the composite beam structure and the second arm extends from the vertical support toward a passenger side portion of the composite beam structure.

12. The cross-car beam assembly of claim 6, wherein the channel defines a hollow chamber within the composite beam structure.

13. A cross-car beam assembly, comprising:
   a composite beam structure including a vertical support;
   a first support arm extending through the vertical support; and
   a channel disposed within the composite beam structure and extending through the first support arm, the channel defining a wide channel therethrough to accommodate a lesser load stress.

14. The cross-car beam assembly of claim 13, further comprising:
   a second support arm extending from the vertical support, wherein the channel extends through the second support arm.

15. The cross-car beam assembly of claim 13, wherein a composite material of the composite beam structure comprises at least one of a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole.

16. The cross-car beam assembly of claim 13, wherein the channel is configured to retain a geometric stiffness of the composite beam structure.

17. The cross-car beam assembly of claim 13, wherein the channel is defined proximate to a center-stack portion of the composite beam structure.

18. The cross-car beam assembly of claim 13, wherein the channel defines a hollow chamber within the composite beam structure.

19. The cross-car beam assembly of claim 13, wherein the vertical support is coupled to a center-stack portion of the composite beam structure.

* * * * *